United States Patent [19]

Darmon et al.

[11] Patent Number: 5,264,530
[45] Date of Patent: Nov. 23, 1993

[54] PROCESS OF POLYMERIZATION IN AN AQUEOUS SYSTEM

[75] Inventors: Michael J. Darmon, Aston, Pa.; Charles T. Berge, Wilmington, Del.; Joseph A. Antonelli, Riverton, N.J.

[73] Assignee: E. I. Du Pont de Nemours and Company, Wilmington, Del.

[21] Appl. No.: 876,764

[22] Filed: May 1, 1992

[51] Int. Cl.$^5$ .............................................. C08F 2/42
[52] U.S. Cl. ................................. 526/194; 526/204; 526/201; 526/206; 526/207; 526/209; 526/213; 526/215; 526/217
[58] Field of Search ............... 526/213, 201, 206, 207, 526/209, 215, 217, 194, 204

[56] References Cited

U.S. PATENT DOCUMENTS

| | | | |
|---|---|---|---|
| 3,382,297 | 5/1968 | Thompson | 526/201 |
| 3,968,059 | 7/1976 | Shimada et al. | 526/68 |
| 4,170,582 | 10/1979 | Mori et al. | 526/273 |
| 4,518,726 | 5/1985 | Kato et al. | 524/32 |
| 4,526,945 | 7/1985 | Carlson et al. | 526/145 |
| 4,547,323 | 10/1985 | Carlson | 260/465.4 |
| 4,621,131 | 11/1986 | Lin et al. | 528/192 |
| 4,680,352 | 7/1987 | Janowicz et al. | 526/120 |
| 4,694,054 | 9/1987 | Janowicz | 526/120 |
| 4,808,656 | 2/1989 | Kania et al. | 524/558 |
| 4,965,317 | 10/1990 | Kania et al. | 525/155 |

FOREIGN PATENT DOCUMENTS

| | | | |
|---|---|---|---|
| 0261942 | 3/1988 | European Pat. Off. | |
| 0268705 | 6/1988 | European Pat. Off. | 526/201 |
| 0331999 | 9/1989 | European Pat. Off. | 526/201 |
| 53-84092 | 7/1978 | Japan | 526/201 |
| 56-139504 | 10/1981 | Japan | 526/201 |
| 3-28202 | 2/1991 | Japan | 526/201 |
| 3-161592 | 7/1991 | Japan | |
| 3-161593 | 7/1991 | Japan | |
| 8103334 | 11/1981 | PCT Int'l Appl. | 526/201 |
| 1083486 | of 1913 | United Kingdom | 526/201 |
| 870191 | 6/1961 | United Kingdom | 526/201 |
| 2161170 | 1/1986 | United Kingdom | 526/201 |

OTHER PUBLICATIONS

"Reactivity of Macromonomers in Free Radical Polymerization" JMS-Rev. Macromol. Chem. Phys. C30(3&4) 305-377 (1990).

"The Chemistry of Unsaturated Oligomers and Polymers" David Scott Harrison, B. App. Sc. Jun. 1988 2-103.

Polymer Bulletin "The Use of Model Compounds in Interpreting the Thermal Degradation of Poly(Methyl Methacrylate)" 325-328 (1984).

"Catalyzed Chain Transfer to Monomer in Free Radical Polymerization" N. S. Enikolopyan, B. R. Smirnov, G. V. Ponomarev, and I. M. Belgovskii 879-889 (1981).

"Polym. Mater. Sci. Eng." 1986, 55, pp. 235-238 Reactive Dimers of . . . : Abbey K. J., G. M. Carlson.

"Copolymerization of Unsaturated Oligo (Methyl Methacrylate): New Macromonomers" P. Cacioli 839-852 (1986).

"Catalytic Chain-Transfer in Polymerization of Methyl Methacrylate. I. Chain-Length Dependence of Chain--Transfer Coefficient" R. Amin Sanayei (1989) 1137-1149.

(List continued on next page.)

Primary Examiner—Joseph L. Schofer
Assistant Examiner—N. Sarofim
Attorney, Agent, or Firm—Chris P. Konkol

[57] ABSTRACT

A improved method of free radical polymerization in an aqueous system, such as an emulsion or suspension process. The polymerization is conducted in the presence of a relatively low molecular weight macromonomer such as can be made with a metal chelate chain transfer catalyst. This method is useful for reducing the molecular weight of a variety of polymers and copolymers, including acrylic and olefinic polymers.

21 Claims, No Drawings

OTHER PUBLICATIONS

"Polymerization Reactivity of Unsaturated End Group Generated during the Disproportionation in Termination Reaction of Methyl Methacrylate Polymerization:" Tanaka 1741-1748 (1989).

"Macromonomer prepared by polymerization of methyl methacrylate in the presence of ethyl α-(bromomethyl)acrylate" Bunichiro Yamada 513-518 (1990).

"Catalytic Chain Transfer in Polymerization of Methyl Methacrylate. II. Continuous Synthesis and Purification of Macromer" K. G. Suddaby 1565-1575.

"Dimethyl 1-Hexene-2,5-Dicarboxylate, Methyl Methacrylate Dimer, as Polymerizable Acrylic Ester Bearing Bulky α-Substituent" Takayuki Otsu 837-842 (1991).

"Preparation of poly(methyl methacrylate) macromonomer by radical polymerization in the presence of methyl α-(bromethyl)acrylate and copolymerization of the resultant macromonomer" Bunichiro Yamada 423-430 (1991).

PROCESS OF POLYMERIZATION IN AN AQUEOUS SYSTEM

FIELD OF THE INVENTION

This invention relates to an improved method of free radical polymerization in an aqueous system. In particular, the method employs a certain kind of macromonomer, having terminal ethylenic unsaturatation, as a chain transfer agent under aqueous conditions. Such a macromonomer is advantageous for controlling the molecular weight of polymers or copolymers produced therewith.

BACKGROUND OF THE INVENTION

In any polymerization process, it is necessary to be able to control the molecular weight of the polymer produced so that it may be fitted to a particular use or need. For example, in unperturbed polymerization systems which fundamentally tend to produce high molecular weight polymers, it may be desirable or necessary to limit the molecular weight of the polymers produced, and this must be done in a fairly predictable and controllable fashion. Such molecular weight limitation may be desirable or necessary in the preparation of polymer solutions for use in paints and finishes which require high solids content to assure reduced solvent emission during application and yet which require low viscosity to facilitate ready application.

Controlling the molecular weight of polymers in an aqueous system has been especially limited or problematic. Mercaptans, such as butyl or dodecyl mercaptan, have been predominantly used to lower the molecular weight. However, in free radical polymerizations, there are a number of conventional means of effecting such molecular weight limitation. These, along with notable disadvantages or problems, include (1) A high initiator/monomer ratio. However, this may be costly in terms of initiator consumption. Also, high initiator levels may also produce undesirable end groups on the polymers produced.

(2) Polymerization at high temperatures, particularly for suspension (bead) or emulsion polymerization. However, this may lead to undesirable depropagation, thermal initiation, and undesirable secondary reactions.

(3) Adding stoichiometric amounts of thiol chain transfer agents to the polymerizing system. However, the attendant incorporation of sulfur-containing agents into the polymer may render it less durable than is desired. There may also be odor problems associated with the use of sulfur-containing chain transfer agents.

(4) Chain transfer agents employing cobalt (II) chelates such as disclosed in U.S. Pat. No. 4,680,352 and U.S. Pat. No. 4,694,054, including aqueous and non-aqueous polymerization. However, a possible disadvantage of these is that some do not work in water and some are adversely affected or deactivated by low pH. They may cause color problems, especially if interaction with some monomers may require higher levels of the cobalt chelate.

The use of terminally ethylenically unsaturated oligomers or macromonomers as chain transfer agents as a means of controlling molecular weight of certain polymers in some contexts is known. There have been a number of studies and articles on macromonomers acting as chain transfer agents.

Macromonomers are known, for example, as disclosed in U.S. Pat. No. 4,547,323; U.S. Pat. No. 4,170,582; U.S. Pat. No. 4,808,656, Japanese patent 3,161,562; Japanese patent 3,161,593. See also, P. Cacioli, et al., *J. Makromol. Sci.-Chem.*, A23 (7), 839–852 (1986) and H. Tanaka, et al., *Journal of Polymer Science; Part A*; Polymer Chemistry, 27, 1741–1748 (1989). Regarding the mention of aqueous polymerization, see U.S. Pat. No. 4,170,582 and Japanese Kokai Hei 3(1991)-161593 and Hei 3(1991)-161592.

It is an object of this invention to provide a method of polymerization in aqueous systems which employs a terminally unsaturated macromonomer as a catalytic chain transfer agent. It is a further object to control the molecular weight of the polymer or copolymer produced.

Use of the present invention avoids the use of sulfur bearing chain transfer agents with their associated problems. The present method also has a number of potential advantages, including lower polymerization temperatures, reduced initiator costs, and improved color. The resulting polymer and coatings may exhibit improved durability.

Yet another object is to provide an improved method of obtaining a final polymer based product less subject to ultraviolet degradability, making then useful in many applications, such as in paints and finishes. Other applications are in the area of imaging, electronics, for example photoresists, engineering plastics, and polymers in general.

These and other objects will become apparent hereinafter.

SUMMARY OF THE INVENTION

The present invention provides an improved free radical polymerization of one or more monomer species in an aqueous system, wherein polymerization occurs in the presence of a chain transfer agent, the improvement characterized in that the chain transfer agent is a terminally unsaturated macromonomer, as defined below. The polymer produced may or may not have functional groups for crosslinking. In a further aspect of the present invention, the polymers so produced have been found to have improved properties for use in coatings and especially in finishes and paints.

DETAILED DESCRIPTION OF THE INVENTION

This invention is directed to a method of free radical polymerization, in an aqueous system or medium, of a desired monomer composition, to produce a wide variety of polymers or copolymers made from olefins such as ethylene, propylene or butadiene, halogenated vinyls such as vinyl chloride or vinyl fluoride, vinylidene fluoride, vinyl ether, tetrafluoroethylene, styrene, acrylic or methacrylic acids and their esters or amides, chloroprene, vinyl acetate, acrylonitrile, and/or mixtures thereof. In the case of acrylic or methacrylic polymers, the monomer composition comprises monomers which are esters of acrylic acid or methacrylic acid. The latter may be polymerized with a variety of comonomers, including comonomers which carry functional groups which can serve as crosslinking sites.

The invention has use, among others, for controlling or reducing the molecular weight of the acrylic polymer or copolymer so produced. The invention is also useful for placing functional groups at the ends of polymers, for example to produce telechelics or pseudotelechelics. Other significant uses are explained in detail below.

The method of the present invention employs, as a free radical chain transfer agent, the use of relatively low molecular weight macromonomers, having ω-unsaturation, which macromonomers may itself be made with a metal chelate chain transfer catalyst. Such macromonomers are compounds that are typically comprised of at least two monomer units. However, although less preferred, it is contemplated that ω-unsaturated macromonomers might also be prepared without polymerization, according to a known or routine organic synthesis.

The macromonomer chain transfer agents employed in the present invention may be a pure compound or a polydisperse mixture of compounds. These materials have utility either alone or as blends when used as chain transfer agents for virtually any free radical polymerization.

Preferably, the present chain transfer agents are used as a polydisperse mixture, which mixture has a distribution of molecular weights having a very low degree of polymerization, i.e., DP=2 to 100, preferably 2 to 20, and most preferably 2 to 7. For each particular macromonomer compound, n is an integer.

The macromonomers of interest, as well as the polymers produced thereby, include those having the following end group:

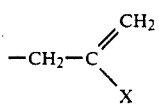

where X is —CONR$_2$, —COOR, OR$^1$, —OCOR, —O-COOR$^1$, —NCOOR$^1$, halo, cyano, or a substituted or unsubstituted phenyl or aryl, wherein each R is independently selected from the group of hydrogen, silyl, or a substituted or unsubstituted alkyl, alkyl ether, phenyl, benzyl, or aryl, wherein said groups may be substituted with epoxy, hydroxy, isocyanato, cyano, amino, silyl, acid (—COOH), halo, or acyl; and wherein R$^1$ is the same as R except not H; wherein each alkyl is independently selected from the group consisting of branched, unbranched, or cyclical hydrocarbons having 1 to 12, preferably 1-6, and most preferably 1-4 carbon atoms; halo or halogen refers to bromo, iodo, chloro and fluoro, preferably chloro and fluoro, and silyl includes —SiR$^2$(R$^3$)(R$^4$) and the like, wherein R$^2$, R$^3$, and R4 are independently alkyl, phenyl, alkyl ether, or phenyl ether, preferably at least two of R$^2$, R$^3$, and R$^4$ being a hydrolyzable group, more preferably two of which are alkyl ether, wherein alkyl is as defined above, preferably methyl or ethyl. A plurality of silyl groups may be condensed, for example, an organopolysiloxane such as —Si(R$^2$)$_2$—O—Si(R$^3$)$_2$R$^4$, wherein R$^2$, R$^3$, and R$^4$ are independently alkyl. See U.S. Pat. No. 4,518,726 for silyl groups in general.

A preferred class of macromonomers for use in the present invention are those macromonomers according to above structure in which X is —CONR$_2$, —COOR, unsubstituted or substituted phenyl, aryl, halo, or cyano, and R is as defined above.

A more preferred class of macromonomers for use in the present invention are those macromonomers according to above structure in which X is —COOR or phenyl and R is alkyl or phenyl unsubstituted or substituted with epoxy, hydroxy, alkoxysilyl or hydrogen.

The macromonomers employed in the present invention are to be distinguished from the more conventional macromonomers having the following end group:

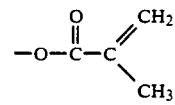

Preferably, the macromonomers employed in the present invention, as well as the polymers produced thereby, are characterized by the following end group:

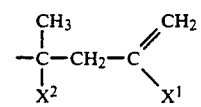

wherein X$^1$ and X$^2$ are independently (the same or different) X as defined above.

The general chemical structure of suitable macromonomers for use in the present invention is described below where n=2 to 100 on average.

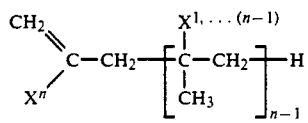

wherein X$^1$ to X$^n$ is independently defined as above for X and n is on average 2 to 100, preferably 2 to 20.

For example, a general formula for a methacrylate macromonomer is as follows:

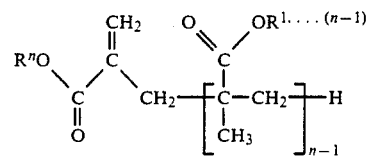

wherein R$^1$ to R$^n$ are independently (the same or different) and defined as above for R and n is on average 2 to 20, preferably 2 to 7.

As a further very specific example, a methyl methacrylate trimer, wherein n equals 3 and R equals —CH$_3$, is as follows.

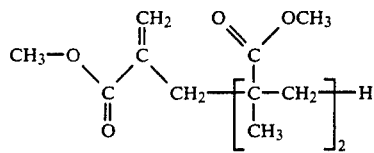

As indicated above, dimers, trimers, tetramers, etc., as defined above, or mixtures thereof, are suitably employed in the present invention. Mixtures of varying molecular weight are probably easier to prepare in large quantities. A wide range of molecular weight oligomers may be made, which in turn may be distilled to obtain a purer or pure oligomer, for example the tetramer. The macromonomers do not have to be in any particular form. The macromonomers may be stored and added in bulk, as liquids or solids, mixed in a solvent, mixed with monomers.

Many of the macromonomers, that can be employed in the present process, are known, for example as taught in Janowicz published European Patent Application 0 261 942, herein incorporated by reference. The alpha-methyl styrene dimer, which is the same as the compound 2,4-diphenyl-4-methyl-1-pentene, is disclosed as a chain transfer agent in aqueous emulsions in the above-cited Japanese references. Therefore, the claimed invention does not include the use of the pure dimer, i.e. a compound according to the above formula when n is 2 and X is phenyl, but does not exclude a distribution of such macromonomers that may include that particular compound. However, chain transfer agents with such a phenyl or aryl group may be less preferred for reasons of the properties of the resulting polymers as a consequence of aromatic end groups. It is noted that the cited Japanese references did not indicate that their pure chain transfer compound was prepared by a polymerization process or by a metal chelate chain transfer process, for example involving cobalt.

According to the present invention, suitable macromonomers are dimers, trimers, tetramers, and higher oligomers of monomers. Thus, macromonomers comprising branched, unbranched or cyclical methacrylates such as methyl, ethyl, propyl, butyl, 2-ethylhexyl, and/or decyl methacrylate; cyclohexyl, phenyl, or benzyl methacrylate; glycidyl methacrylate, hydroxyethyl or hydroxypropyl methacrylate, methacrylic acid, methacrylonitrile, methacrylamide, 2-isocyanatoethyl methacrylate, dimethylaminoethyl methacrylate, N,N-dimethylamino-3-propyl methacrylamide, t-butylaminoethyl methacrylate, and silanes such as methacryloxypropyl-trimethoxysilane, or mixtures of the foregoing, and numerous others can be employed. Hetero macromonomers, as for example, the reaction product of methylmethacrylate and methacrylonitrile are suitable. These macromonomers are most easily made by a metal chelate catalytic chain transfer, for example a cobalt chelate, as will be explained below, but they could be made by other methods as well.

The present macromonomers can be used, for example to control molecular weight during polymerization of acrylic and other monomers, in an effective amount of only a few percent by weight of the macromonomer present in the monomer mixture. A suitable range of macromonomer chain transfer agent is between 0.01% and 80% by weight, preferably about 0.1 to 40%, and most preferably 1 to 10% by weight of the monomer reactants. For bulk or bead polymerization, where in some cases it may be desired to bring down the molecular weight only slightly from its unregulated molecular weight, then only 0.001 to 5% of the macromonomer chain transfer agent may be suitable.

The polymers made according to the present invention have wide utility, including use in coatings and sealants, basically wherever one skilled in the art would use a low molecular weight, low dispersity polymeric material. With respect to coatings in which durability is desired, polymers and compositions thereof, made according to the present invention, can have advantageous properties associated with the above mentioned end groups. For example, the QUV performance of clears thusly made may be improved compared to clears made with an alternative method such as high initiator level, high temperature, or alternative chain transfer agents. The miscibility and/or viscosity differences may also be improved. Hence, polymers can be made without the deleterious moieties that enter from alternative methods of molecular weight control.

Although applicants do not wish to be bound by any theory, it is believed that, when employing the present macromonomer chain transfer agents, the attendant molecular weight control occurs because the macromonomer can, in addition to copolymerizing normally, also undergo a beta-scission reaction. This beta-scission reaction causes part of a macromonomer molecule to become attached to the other end of the growing polymer molecule, thus terminating its growth. The detached portion of the macromonomer, now containing a free radical center, propagates by addition to free monomers in the reaction system. To the extent that normal copolymerization is also taking place, there will be additional macromonomer units randomly incorporated along the polymer chain. If beta-scission is made to predominate over normal copolymerization, then telechelic polymers having a functional group attached to the end of the polymer may be produced at high levels. Although illustrated with a particular X group, from the above formula, the following kind of reaction mechanism is believed to occur.

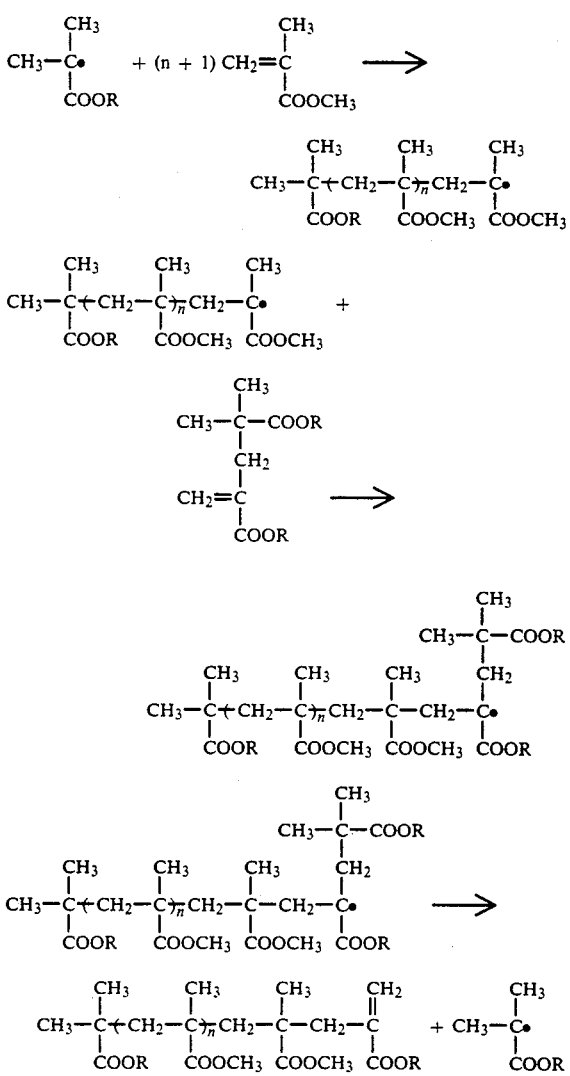

The present invention is directed to free radical polymerization of unsaturated monomers in an aqueous medium. As indicated above, such use solves the long standing problem of molecular weight control in emulsion polymerization without using sulfur compounds, as indicated above. By the term aqueous is meant that the polymerization is conducted in water as the major component of the medium. This includes polymerization such as occurs in suspension, emulsion or solution polymerization, as will be familiar to those skilled in the art. Such polymerization is typically conducted in a solvent which is primarily water, in most cases essentially water, although lesser amounts of organic solvents, for example alcohols, may be included.

Polymerization may be a batch process in which the monomers, initiator and water are loaded into the reactor and heated to an effective polymerization temperature. In a batch process, the reaction may be run under pressure to avoid monomer reflux and the water medium can be viewed as absorbing the reaction heat. The suspension agent controls the particle size and the polymer settles out of water and is filtered out. A typical example of a polymer is a simple acrylic polymer comprising 80% methyl methacrylate and 20% methacrylic acid.

The macromonomers employed in the present invention are typically prepared by standard solution polymerization techniques, but may also be prepared by emulsion, suspension or bulk polymerization processes. Preferably, a metal chelate chain transfer catalyst is employed in the method of preparation. Such a method is disclosed in the above mentioned U.S. Pat. No. 4,680,352, issued to Janowicz et al. and U.S. Pat. No. 4,694,054, issued to Janowicz. both of which are commonly assigned and hereby incorporated by reference in their entirety. To obtain some of the relatively lower molecular weight macromonomers of the present invention, one could employ higher amounts of a metal chelate chain transfer agent. The same prior art process can be used in making the present relatively low molecular weight macromonomers or oligomers, such as dimers and trimers. In effect, one chain transfer agent is used to make another chain transfer agent.

An initiator which produces carbon-centered radicals, sufficiently mild not to destroy the metal chelate chain transfer agent, is typically employed in preparing the macromonomers. Azo compounds, as described below, are suitable initiators.

The method of making the present macromonomers can employ a wide variety monomers and monomer mixtures.

The kind of reaction sequence which is preferably employed for preparing the present macromonomer chain transfer agents, although with reference to the particular case where X is —COOCH3 in the above formula, is illustrated as follows.

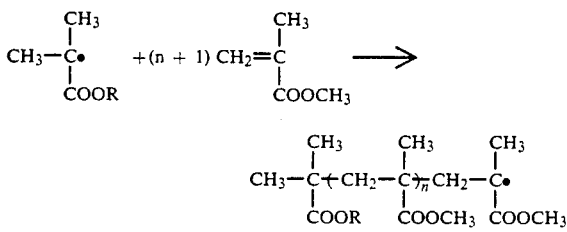

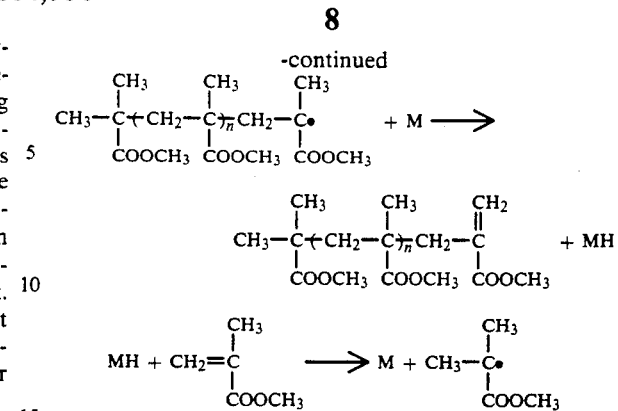

wherein "M" is a metal chelate catalytic chain transfer agent such as one of the cobalt complexes known to those of skill in the art.

As will be apparent to one skilled in the art, these macromonomers could also be prepared in situ from appropriate reactants, although they are preferably made separately and then added to the polymerization reaction mixture.

The aqueous polymerization process according to the present invention, in which polymers or copolymers are produced employing the above described macromonomer chain transfer agents, is suitably carried out at 20°–170° C., preferably 50°–145° C.

Any source of radicals or any of the known class of polymerization initiators is suitable, provided the initiator has the requisite solubility in the solvent or monomer mixture chosen and has an appropriate half life at the temperature of polymerization. Polymerization initiators may be redox or thermally or photochemically induced, for example azo, peroxide, peroxyester, or persulfate. Preferably, the initiator has a half life of from about 1 minute to about 1 hour at the temperature of polymerization. Some suitable initiators include ammonium persulfate, azocumene; 2,2'-azobis(2-methyl)-butanenitrile; 4,4'-azobis(4-cyanovaleric acid); and 2-(t-butylazo)-2-cyanopropane. Other non-azo initiators having the requisite solubility and appropriate half life may also be used.

The polymerization process can be carried out as either a batch, semi-batch, continuous, or feed process. When carried out in the batch mode, the reactor is typically charged with macromonomer and monomer, or aqueous medium and monomer. To the mixture is then added the desired amount of initiator, typically such that the M/I (monomer to initiator) ratio is 10 to 200. In typical examples, the macromonomer chain transfer catalyst is added in the amount such that the catalyst/initiator or C/I ratio is in the range of 0.10 to 20. The mixture is heated for the requisite time, usually one-half hour to ten hours.

If the polymerization is to be carried out as a feed system, particularly for emulsions, the reaction is typically carried out as follows. The reactor is charged with aqueous medium. Into a separate vessel are placed the monomer and macromonomer. In a separate vessel is added initiator and aqueous medium. The aqueous medium in the reactor is heated and stirred while the monomer and macromonomer solutions are introduced, for example by a syringe pump or other pumping device. The rate of feed is determined largely by the quantity of solution. When the feed is complete, heating may be continued for an additional half hour or more.

In either type of process, the polymer may be isolated by stripping off the aqueous medium and unreacted monomer or by precipitation with a non-solvent. Alternatively, the polymer solution may be used as such, if appropriate to its application.

The polymerization process is suitably carried out with a variety of monomers in the reaction mixture employed to form the polymer product. For example, methacrylate and acrylate ester monomers and styrene may be included, Methacrylates which are useful in this invention include branched, non-branched, or cyclical alkyl esters of $C_1$ to $C_{12}$ alcohols and methacrylic acid, for example, methyl and ethyl methacrylate. Other monomers include, but are not restricted to, allyl, alkoxysilyl, glycidyl, hydroxyalkyl (for example, hydroxyethyl and hydroxypropyl), allyloxyethyl, and mono or dialkylaminoalkyl methacrylates, wherein the alkyl is suitably has 1 to 12 carbon atoms, preferably 1 to 8, most preferably 1 to 4 carbon atoms.

Other monomers that can be polymerized according to the present process include tetrafluoroethylene, vinyl chloride, styrene, vinyl fluoride, vinylidene fluoride, propylene, ethylene, vinyl ethers, vinyl esters, anhydrides of maleic or itaconic and their acids, and the like.

The invention has wide applicability in the field of free radical polymerization and may be used to produce polymers and compositions having many uses. The polymers produced thereby may exhibit improved durability, including improved resistance to ultraviolet degradability. Such polymers may be used in coatings, including clearcoats and basecoat finishes or paints for automobiles and other vehicles or maintenance finishes for a wide variety of substrates. Such coatings may further include pigments, durability agents, corrosion and oxidation inhibitors, sag control agents, metallic flakes, and other additives. Additional applications are in the fields of imaging, electronics, for example photoresists, engineering plastics, adhesives, sealants, and polymers in general.

The following examples demonstrate the method of the present invention. Unless indicated otherwise, all parts are by weight and all molecular weights are based on a polystyrene standard.

EXAMPLES 1-3

Examples 2 and 3 illustrate an emulsion polymerization process according to the present method, with Example 1 being a control. Varying amounts X, by weight of reaction mixture, of the macromonomer chain transfer agent are employed. The overall reaction composition, by weight, is BMA/2EHMA/HEMA/MAA/methacrylamide/oligomeric pMMA in the respective ratio of 30-X: 61:3:3:3:X, wherein BMA is butyl methacrylate, 2EHMA is 2-ethylhexyl methacrylate, HEMA is hydroxyethyl methacrylate, MMA is methyl methacrylate, and pMMA is a polymethylmethacrylate macromonomer of the kind described by the general formula above and having an number average molecular weight (hereafter $M_n$) of 316 and a polymer dispersity or $M_w/M_n$ (hereafter D) of 1.31. The polymerization initiator is ammonium persulfate. The following components were employed in the polymerization.

|  | Parts by weight |
|---|---|
| Part 1 |  |
| Demineralized Water | 250.94 |
| TREM LF-40 | 1.33 |
| Dupanol WAQE | 1.11 |
| Part 2 |  |
| Demineralized Water | 32.64 |
| Ammonium persulfate | 0.76 |
| Part 3 |  |
| Butylmethacrylate | 90.52-X |
| 2-Ethylhexyl methacrylate | 184.05 |
| Hydroxyethyl methacrylate | 9.05 |
| Methacrylamide | 9.05 |
| Methacrylic acid | 9.05 |
| Oligomeric pMMA | X |
| TREM LF-40 | 3.80 |
| DUPANOL WAQE | 3.11 |
| Demineralized Water | 181.87 |
| Part 4 |  |
| Demineralized Water | 80.88 |
| TOTAL | 858.16 |

In the above list, TREM LF-40 is sodium dodecyl allyl sulfosuccinate (40%) in water and DUPANOL WAQE is sodium lauryl sulfate (30%) in water are commercially available emulsion stabilizers.

Part 1 is charged into a 2 liter reactor, mixed to dissolved and heated to 185°-187° F. Part 2 is charged into an initiator feed vessel in order, mixed and dissolved. Part 3 is charged into the monomeric feed vessel in order, without mixing. The contents of Part 3 are preemulsified and adjusted to an emulsion temperature of 80°-85° F. Polymerization is started by adding 5% of Part 3 into the reactor in a single shot. The reactor temperature is stabilized to 185°-187° F. and all of Part 2 (initiator solution) is added in a single shot. The temperature of the reactor will rise. When stable, the remainder of Part 3 is added over 90 minutes. The reactor temperature is controlled to 190°-194° F. for 60 minutes, cooled to 100° F., and Part 4 is added over 5 minutes.

The solids content of the product is 35.35%. The results for the product obtained in each of examples 1 to 3 are shown in Table 1 below. This Table demonstrates that low level additions of the oligomeric pMMA is an effective chain transfer agent, in an aqueous system, which efficiently reduces the molecular weight of the latex from an undeterminable molecular weight thought potentially having an Mn greater than 100,000 to an Mn below 12,000. Table 1 also demonstrates that the molecular weight reduction has little or no effect on mean particle size of the latex.

TABLE 1

| BMA/2EHMA/HEMA/MAA/METHACRYLAMIDE/OLIGOMERIC pMMA (BY WEIGHT) 30-X:61:3:3:3:X ||||||||
| EXAMPLE | OLIGOMER CTA (Mn = 316; D = 1.31) | X | Mn | Mw | Dispersity | Particle Size ||
|  |  |  |  |  |  | Mean diam. | St. Dev. |
| 1 | CONTROL | 0 | * | * | * | 107 nm | 31 nm |
| 2 | pMMA | 5 | 11743 | 31156 | 2.65 | 105 nm | 30 nm |
| 3 | pMMA | 10 | 7196 | 22997 | 3.20 | 108 nm | 27 nm |

*Too high m. wt. to dissolve in solvent for GPC analysis

EXAMPLES 4 to 8

Examples 5 to 8 illustrate an emulsion according to the present invention, with example 4 being the control. The same macromonomer as in Examples 2-3 were used, except that the pMMA chain transfer agent was introduced into the reaction either by direct addition at the beginning of the polymerization (all in the reactor) or added concurrently with the monomers over 90 minutes. The overall reaction composition, by weight, is again BMA/2EHMA/HEMA/MAA/methacrylamide/oligomeric pMMA according to the respective ratio of 30-X:61:3:3:3:X, wherein X varies in each example as shown in Table 2 below. In these examples, the polymerization initiator is the azo compound 4,4'-bis-azobis(4-cyanovaleric acid). The following components were employed.

The solids content of the product was 35.25%. The results for the polymer product obtained in each of examples 4-8 are shown in Table 2 below. This Table demonstrates the effectiveness of oligomeric chain transfer agents using a different water soluble polymerization initiator. Again the control (Example 4) provides a latex with unmeasurable molecular weight, but presumed to be above an $M_n$ of 100,000. Addition of the pMMA to the polymerization, either by placement in the reactor at the beginning of the process (Examples 5 and 6) or through continuous addition concurrent with other monomers (Examples 7 and 8), provides substantial molecular weight reduction. Particle size does not vary much above the control and in most cases found to be smaller than the control.

TABLE 2

BMA/2EHMA/HEMA/MAA/METHACRYLAMIDE/OLIGOMERIC pMMA (BY WEIGHT)
30-X:61:3:3:3:X

| EXAMPLE | OLIGOMER CTA (Mn = 316; D = 1.31) | X | Location of CTA | Mn | Mw | Dispersity | Particle Size Mean diam. | St. Dev. |
|---|---|---|---|---|---|---|---|---|
| 4 | CONTROL | 0 | | * | * | * | 144 nm | 24 nm |
| 5 | pMMA | 5 | Reactor | 11260 | 22063 | 1.96 | 166 nm | 56 nm |
| 6 | pMMA | 10 | Reactor | 12083 | 24181 | 2.00 | 112 nm | 37 nm |
| 7 | pMMA | 5 | Feed | 19237 | 59256 | 3.08 | 126 nm | 38 nm |
| 8 | pMMA | 10 | Feed | 6717 | 15760 | 2.35 | 115 nm | 25 nm |

*Too high m. wt. to dissolve in solvent for GPC analysis

| | Parts by weight |
|---|---|
| Part 1 | |
| Demineralized water | 250.94 |
| TREM LF-40 | 1.33 |
| DUPANOL WAQE | 1.11 |
| Oligomeric pMMA (Examples 5 & 6) | X |
| Part 2 | |
| Demineralized water | 32.64 |
| 4,4'-bis-azobis(4-cyanovaleric acid) | 0.93 |
| Part 3 | |
| Butyl methacrylate | 90.52-X |
| 2-Ethylhexyl methacrylate | 184.05 |
| Hydroxyethyl methacrylate | 9.05 |
| Methacrylamide | 9.05 |
| Methacrylic acid | 9.05 |
| Oligomeric pMMA (Examples 7 & 8) | X |
| TREM LF-40 | .80 |
| DUPANOL WAQE | 3.11 |
| Demineralized water | 181.87 |
| Part 4 | |
| Demineralized water | 80.88 |
| TOTAL | 858.16 |

Part 1 is charged into a 2 liter reactor, mixed to dissolve and heated to 185°-187° F. Part 2 is charged into an initiator feed vessel in order, mixed and dissolved. Part 3 is charged into the monomeric feed vessel in order, without mixing. The contents of Part 3 are preemulsified and adjusted to an emulsion temperature of 80°-85° F. Polymerization is started by adding 5% of Part 3 into the reactor in a single shot. The reactor temperature is stabilized to 185°-187° F. and all of Part 2 (initiator solution) is added in a single shot. The temperature of the reactor will rise. When stable, the remainder of Part 3 is added over 90 minutes. The reactor temperature is controlled to 190°-194° F. At completion of Part 3 addition, the reactor is held at a temperature of 190°-194° F. for 60 minutes, cooled to 100° F., and Part 4 is added over 5 minutes.

EXAMPLES 9-10

These examples illustrate an emulsion process according to the present invention having a functional macromonomer, poly(hydroxyethyl methylacrylate) or pHEMA. The overall reaction composition, by weight, is BMA/2EHMA/MAA/methacrylamide/pHEMA, according to the respective ratio of 30:61:3:3:3, wherein 2EHMA is 2-ethylhexyl methacrylate, MMA is methyl methacrylate, HEMA is hydroxyethyl methacrylate, and pHEMA is a poly(hydroxyethyl methacrylate) macromonomer chain transfer agent. The following components were employed.

| | Parts by weight |
|---|---|
| Part 1 | |
| Demineralized water | 250.40 |
| TREM LF-40 | 1.33 |
| DUPANOL WAQE | 1.11 |
| Part 2 | |
| Demineralized water | 32.64 |
| Ammonium persulfate (Example 9) | 0.76 |
| 4,4'-Bisazobis(4-cyano-valeric acid) (Example 10) | 0.93 |
| Part 3 | |
| Butyl methacrylate | 90.52 |
| 2-Ethylhexyl methacrylate | 184.05 |
| Methacrylamide | 9.05 |
| Methacrylic Acid | 9.05 |
| pHEMA* | 12.57 |
| TREM LF-40 | 3.80 |
| DUPANOL WAQE | 3.11 |
| Demineralized water | 181.87 |
| Part 4 | |
| Demineralized water | 80.88 |
| TOTAL | 858.16 |

*72% in methylethyl ketone

Part 1 is charged into a 2 liter reactor, mixed to dissolve and heated to 185°-187° F. Part 2 is charged into an initiator feed vessel in order, mixed and dissolved. Part 3 is charged into the monomeric feed vessel in order, without mixing. The contents of Part 3 are preemulsified and adjusted to an emulsion temperature of 80°-85° F. Polymerization is started by adding 5% of Part 3 into the reactor in a single shot. The reactor temperature is stabilized to 185°-187° F. and all of Part 2 (initiator solution) is added in a single shot. The temperature of the reactor will rise. When stable, the remainder of Part 3 is added over 90 minutes. The reactor temperature is controlled to 190°-194° F. At completion of Part 3 addition, the reactor is held at a temperature of 190°-194° F. for 60 minutes, cooled to 100° F., and Part 4 is added over 5 minutes.

The solids content of the product is 34.07%. The results for the polymer product obtained are shown in Table 3 below. Table 3 demonstrates that the functionalized oligomeric chain transfer agent (pHEMA) can also perform as an effective chain transfer agent using either persulfate or azo polymerization initiators.

|  | Parts by weight |
|---|---|
| Part 3 | |
| Methyl methacrylate | 82.66-X |
| Styrene | 46.80 |
| 2-ethyl hexylacrylate | 156.00 |
| 2-hydroxy ethylacrylate | 9.36 |
| methacrylic acid | 9.36 |
| Oligomeric pMMA | X |
| Methacrylamide | 7.80 |
| TREM LF-40 | 3.80 |
| Dupanol WAQE | 3.11 |
| Demineralized water | 181.87 |
| Part 4 | |
| Demineralized water | 79.00 |
| TOTAL | 783.88 |

Part 1 is weighted into a 2 liter reactor, mixed to dissolve and heated to 185°-187° F. The ingredients in Part 2 are loaded into a initiator feed pot in order, mixed and dissolved. Part 3 is loaded into the monomer feed vessel, in order as listed, without mixing. The contents of Part 3 are preemulsified and adjusted to an emulsion temperature of 80°-85° F. As soon as the emulsion is made, 5% of the monomer feed is dropped into the reactor in a single shot. The reactor temperature is stabilized to 185°-187° F. and all of Part 2 is added in a single shot. The reactor temperature will begin to raise in about 5 minutes. When the temperature begins to level out, the remainder of Part 3 is then added over 90 minutes. Temperature should be controlled to 190°-194° F. At the completion of the addition of Part 3, the temperature is held for 60 minutes and then cooled to 104° F. Part 4 is added into the feed vessel over 5 minutes.

The theoretical solids are 29.25%. The results are shown in Table 4 below and demonstrate that the oligomeric pMMA chain transfer agent can reduce the polymer molecular weight of polymers composed mostly of acrylate and styrene monomers.

TABLE 3

BMA/2EHMA/MAA/METHACRYLAMIDE/OLIGOMERIC HEMA (BY WEIGHT)
30:61:3:3:3

| EXAMPLE | OLIGOMER CTA (Mn = 320; D = 1.24) | Initiator | | Mn | Mw | Dispersity | Particle Size | |
|---|---|---|---|---|---|---|---|---|
| | | Grams | Type | | | | Mean diam. | St. Dev. |
| 1 | CONTROL | 0.76 | Ammonium Persulfate | * | * | * | 107 nm | 31 nm |
| 9 | pHEMA | 0.76 | Ammonium Persulfate | 40983 | 209451 | 5.11 | 135 nm | 29 nm |
| 4 | CONTROL | 0.93 | AZO** | * | * | * | 144 nm | 24 nm |
| 10 | pHEMA | 0.93 | AZO** | 44915 | 406319 | 9.05 | 142 nm | narrow |

*Too high m. wt. to dissolve in solvent for GPC analysis
**4,4'-Bis-Azobis (4-Cyanovaleric Acid)

EXAMPLES 11 TO 13

Examples 12 and 13, with Example 11 as a control, illustrate, according to the present method, the preparation of a polymer in an aqueous system, from MMA/STY/2EHA/HEA/MAA/METHACRYLAMIDE/OLIGOMERIC pMMA in the respective ratio, by weight, of 26.5-X:15:50:3.0:3.0:2.5:X, wherein MMA is methyl methacryate, STY is styrene, 2EHA is 2-ethylhexyl acrylate, HEA is hydroxy ethyl acrylate, MAA is methacrylic acid, and "oligomeric pMMA" is a poly(methyl methacrylate) macromonomer according to the present invention. The following components are employed in the polymerization.

|  | Parts by weight |
|---|---|
| Part 1 | |
| Demineralized water | 250.94 |
| TREM LF-40 | 1.33 |
| DUPANOL WAQE | 1.11 |
| Part 2 | |
| Demineralized water | 32.64 |
| Ammonium persulfate | 0.76 |

TABLE 4

MMA/STY/2EHA/HEA/MAA/METHACRYLAMIDE/OLIGOMERIC MMA (BY WEIGHT)
26.5-X:15:50:3:3:2.5:X

| EXAMPLE | OLIGOMER CTA (Mn = 294; D = 1.24) | X | Initiator Type | Mn | Mw | Dispersity | Particle Size | |
|---|---|---|---|---|---|---|---|---|
| | | | | | | | Mean diam. | St. Dev. |
| 11 | CONTROL | 0 | Ammonium Persulfate | * | * | * | 86 nm | narrow |
| 12 | pMMA | 5 | Ammonium Persulfate | 17054 | 44167 | 2.59 | 79.8 nm | 26 nm |
| 13 | pMMA | 10 | Ammonium Persulfate | 10015 | 23170 | 2.31 | 81.2 nm | narrow |

*Too high m. wt. to dissolve in solvent for GPC analysis

EXAMPLE 14

This example illustrates, according to the present method, the preparation of a polymer in an aqueous system, from MMA/STY/2EHA/HEA/MAA/N-Methylol-methacrylamide/oligomeric pMMA in the respective ratio, by weight, of 24:1:50:5.0:5.0:5:10, wherein MMA is methyl methacryate, STY is styrene, 2EHA is 2-ethylhexyl acrylate, HEA is hydroxy ethyl acrylate, MMA is methacrylic acid, and "oligomeric pMMA" is a poly(methyl methacrylate) macromonomer according to the present invention. The following components are employed in the polymerization.

| | Parts by weight |
|---|---|
| Part 1 | |
| Demineralized water | 878.29 |
| TREM LF-40 | 4.66 |
| POLYSTEP B1 | 3.33 |
| Part 2 | |
| Demineralzed water | 104.24 |
| Ammonium persulfate | 2.66 |
| Part 3 | |
| Methyl methacrylate | 360.97-X |
| Styrene | 10.62 |
| 2-Ethylhexyl acrylate | 530.84 |
| 2-Hydroxyethyl acrylate | 53.08 |
| Methacrylic acid | 53.08 |
| pMMA macromonomer | X |
| N-methylol-methacrylamide | 88.47 |
| TREM LF-40 | 13.30 |
| POLYSTEP B1 | 9.31 |
| Demineralized water | 547.45 |
| Part 4 | |
| Demineralized water | 10.01 |
| Ammonium persulfate | 1.50 |
| Part 5 | |
| Aqueous ammonia (29%) | 19.96 |
| Biocide | 2.66 |
| Demineralized water | 369.96 |
| Total | 3064.38 |
| Solids Total | 1081.63 |
| Theoetical solids | 35.30 |

Part 1 is weighted into a 2 liter reactor, mixed to dissolve and heated to 185°-187° F. The ingredients in Part 2 are loaded into a initiator feed pot in order, mixed and dissolved. Part 2 is loaded into the monomer feed vessel, in order as listed, without mixing. The contents of Part 3 are preemulsified and adjusted to 80°-85° F. As soon as the emulsion is made, the monomer feed is dropped 5% into the reactor (setting at 185°-187° F.) in a single shot. The reactor temperature is stabilized to 185°-187° F. and all of part 2 is added in a single shot. The reactor temperature will begin to raise in about 5 minutes. When temperature begins to level out the remainder of Part 3 is begun to be added over 90 minutes. Temperature should be controlled to 190°-194° F. Part 4 is added to the reactor is a single shot 60 minutes after the start of Part 3. The results are shown in Table 5. This example demonstrates that modifications to the composition, including the use of the functionalized and reactive monomers n-methylol-methacrylamide in the process have little or no effect on the efficiency of the chain transfer agent. At the completion of Part 3 the temperature is held for 60 minutes and then cooled to 104° F. Part 5 is added into the feed vessel over 5 minutes.

TABLE 5

MMA/STY/2EHMA/HEA/MAA/N-METHYLOL-METHACRYLAMIDE/OLIGOMERIC MMA (BY WEIGHT) 24:1:50:5:5:5:10

| EXAMPLE | OLIGOMER CTA (Mn = 270; D = 1.15) | X | Initiator Type | Mn | Mw | Dispersity | Particle Size Mean diam. | St. Dev. |
|---|---|---|---|---|---|---|---|---|
| 14 | pMMA | 10 | Ammonium Persulfate | 5391 | 14807 | 2.75 | 115 nm | 42 nm |

EXAMPLE 15

This example illustrates a suspension polymerization, according to the present invention, with VAZO azo 64 initiator and an ACRYLSOL A1 polyacrylic acid suspension agent (hydroxylethyl cellulose may be used instead). A homogenous (100%) linear methyl methacrylate polymer product is thereby prepared. The molecular weight of the product is controlled with a macromonomer of moderate molecular weight. The resulting polymer product is 95% of a methyl methacrylate and 5% of a methyl methacrylate macromonomer. The components employed are as follows.

| | Parts by weight |
|---|---|
| Part 1 | |
| Deionized water | 1506.86 |
| ACRYLSOL A1 | 50.00 |
| Sub-total | 1507.61 |
| Part 2 | |
| methyl methacrylate | 435.83 |
| Macrometer | 22.94 |
| Sub-total | 458.77 |
| Part 3 | |
| VAZO64 | 2.00 |
| Deionized water | 3.14 |
| Sub-total | 5.14 |
| Final Total | 1971.52 |

The initiator VAZO 64, a registered trademark, is commercially available for Du Pont (Wilmington, Del.) and ACRYLSOL A, a registered trademark, is commercially available from Rohm & Haas (Philadelphia, Pa.)

Into a jacketed flask with internal baffles and a high speed stirrer is added methyl methacrylate monomer, a low molecular weight polyacrylic acid, and deionized water. The multi-bladed stirrer is engaged and increased in speed to about 800 rpm. The contents of the flask are heated to 65° C. and the initiator VAZO 64 is added. The contents are heated to 80° C. and maintained at that temperature for two hours. The contents of the flask are filtered through cloth and washed with deionized water. The solid polymer is placed in an oven to dry.

The reaction product obtained is 461.52 parts (23.41%) solids, the reaminder being deionized water solvent. The solids include 458.77 parts (23.27%) methyl methacrylate monomers. An analogous procedure was carried out with 2.5% macromonomer and, as a control with no chain transfer agent, neither a mercaptan nor a macromonomer. The results are shown in Table 6 below.

TABLE 6

| Process | Mol. wt. Number ave. | Mol. wt. Weight ave. |
| --- | --- | --- |
| No mercaptan | >100,000 | >200,000 |
| 2.5% MMA macro | 37314 | 74830 |
| 5.0% MMA macro | 20924 | 43539 |

EXAMPLE 16

This example illustrates the preparation of a pMMA macromonomer chain transfer agent such as employed in the present invention. A reactor was equipped with a stirrer, thermocouple, and condensor. The reactor was held under nitrogen positive pressure and the following ingredients were employed.

| | Parts by weight |
| --- | --- |
| Part 1 | |
| Ethyl acetate | 248.66 |
| Methyl acrylate | 499.07 |
| Part 2 | |
| Ethyl acetate | 87.25 |
| Catalyst* | 0.3540 |
| Part 3 | |
| Methyl methacrylate | 1996.71 |
| Part 4 | |
| VAZO 52 | 19.62 |
| Ethyl acetate | 848.33 |

Part 1 was charged to the reactor and heated to 80° C. When the temperature stabilized at 80° C., Part 2 was charged to the reactor as a single shot feed. Part 3 (the monomer feed) and Part 4 (the initiator feed) were added concurrently, except that Part 3 was added over 240 minutes and Part 4 was added over 300 minutes. When the initiator feed in complete, the reaction mixture is held for 30 minutes. The solvent and unreacted monomer are then distilled off.

EXAMPLE 17

This example illustrates the preparation of a EMA/BMA macromonomer chain transfer agent such as employed in the present invention, wherein EMA is ethyl methacrylate and BMA is butyl methacrylate. A reactor was equipped with a stirrer, thermocouple, and condensor. The reactor was held under nitrogen positive pressure and the following ingredients were employed.

| | Parts by Weight |
| --- | --- |
| Part 1 | |
| Ethyl acetate | 248.66 |
| Ethyl methacrylate | 250.00 |
| Butyl methacrylate | 250.00 |
| Part 2 | |
| Ethyl acetate | 87.25 |
| Catalyst* | 0.3540 |
| Part 3 | |
| Ethyl methacrylate | 998.36 |
| Butyl methacrylate | 998.36 |
| Part 4 | |
| VAZO 52 | 19.62 |
| Ethyl acetate | 648.33 |

*diaquobis(borondifluorodiphenyl-glyoximato) cobaltate (II)

Part 1 was charged to the reactor and heated to 80° C. When the temperature stabilized at 80° C., Part 2 was charged to the reactor as a single shot feed. Part 3 (the monomer feed) and Part 4 (the initiator feed) were added concurrently, except that Part 3 was added over 240 minutes and Part 4 was added over 300 minutes. When the initiator feed in complete, the reaction mixture is held for 30 minutes. The solvent and unreacted monomer are then distilled off.

The best mode presently contemplated for carrying out the invention is represented by the disclosure and claims herein, it being understood that selection of the best mode will depend on a variety of factors, including the monomers being polymerized, the particular chain transfer agent and the initiator employed, and the amounts thereof, and the polymerization conditions, such as temperature, pressure, conversion and yield.

We claim:

1. A method of free radical polymerization of unsaturated monomers, characterized by being carried out in aqueous medium in the presence of a macromonomer, or a molecular weight distribution of macromonomers, having the following end group:

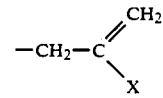

where X is —CONR$_2$, —COOR, OR$^1$, —OCOR, —OCOOR$^1$, —NCOOR$^1$, halo, cyano, or a substituted or unsubstituted phenyl or aryl, wherein each R is independently selected from the group consisting of hydrogen, silyl, or a substituted or unsubstituted alkyl, alkyl ether, phenyl, benzyl, and aryl, wherein substituted means with a substituent selected from the group consisting of epoxy, hydroxy, isocyanato, cyano, amino, silyl, acid, halo, or acyl; and wherein R$^1$ is the same as R except not H; and wherein each alkyl is independently selected from the group consisting of branched, unbranched, or cyclical hydrocarbons having 1 to 12 carbon atoms; and halo or halogen is bromo, iodo, chloro or fluoro; except excluding the use of a pure dimer when X is substituted or unsubstituted phenyl or aryl.

2. The method of claim 1, wherein the polymerization is an emulsion or suspension polymerization of unsaturated monomers.

3. The method of claim 1, wherein polymerization is conducted in the presence of an effective amount of a macromonomer, or molecular weight distribution of macromonomers, having the following formula:

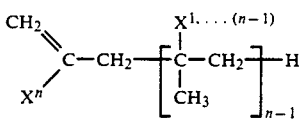

wherein n is on average 2 to 100 and X$^1$ to X$^n$ are independently X as defined above.

4. The method of claims 1 or 3, wherein polymerization is conducted in the presence of a macromonomer, or molecular weight distribution of macromonomers, in which X is —CONR$_2$, —COOR, or an unsubstituted or substituted phenyl or aryl, and R is as defined above.

5. The method of claims 1 or 3, wherein polymerization is conducted in the presence of a macromonomer, or molecular weight distribution of macromonomers, in which X is —COOR or phenyl and R is alkyl or phenyl, either of which may be unsubstituted or substituted with epoxy, hydroxy, silyl or acid.

6. The method of claim 1 or 3, wherein polymerization is conducted in the presence of an effective amount of a macromonomer, or molecular weight distribution of macromonomers, having the following formula:

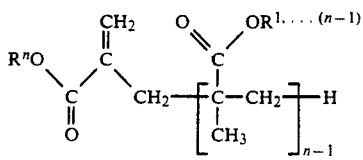

wherein n is, on average, 2 to 20 and $R^1$ to $R^n$ are each independently selected from the group consisting of hydrogen, substituted or unsubstituted alkyl, alkyl ether, phenyl, benzyl, or aryl, which substituent is selected from the group consisting of epoxy, hydroxy, isocyanato, cyano, amino, silyl, acid, halo, or acyl; and each alkyl is independently selected from the group consisting of branched, unbranched, or cyclical hydrocarbons having 1 to 12 carbons, halo is selected from the group consisting of bromo, iodo, chloro and fluoro, and silyl is —SiR$^2$(R$^3$)(R$^4$), wherein $R^2$, $R^3$, and $R^4$ are independently alkyl, phenyl, alkyl ether, or phenyl ether, wherein alkyl is as defined above.

7. The method of claim 1, wherein the polymerization is carried out at 20° to 170° C.

8. The method of claim 1, wherein the polymerization is carried out in the presence of an initiator.

9. The method of claim 8, wherein the initiator is an azo or peroxide containing compound.

10. The method of claim 1, wherein a mixture of different monomers is copolymerized.

11. The method of claim 10, wherein a portion of the monomers have a functionality which is capable of reacting to form a crosslinking site.

12. The method of claim 11, wherein the functionality is selected from the group consisting of epoxy, hydroxy, isocyanato, silyl, amine, acid, acryl and methacrlyamide, or combinations thereof.

13. The method of claim 1, wherein the macromonomer chain transfer agents employed in the present invention have a distribution of molecular weights and have a degree of polymerization ranging from 2 to 100.

14. The method of claim 13, wherein the macromonomer chain transfer agents employed in the present invention have a distribution of molecular weights and have a degree of polymerization ranging from 2 to 20.

15. The method of claim 3, wherein n is on average 2 to 7.

16. The method of claim 1, wherein the macromonomers are substantially pure.

17. The method of claim 1, wherein the macromonomer is comprised of alkyl methacrylate wherein the alkyl has 1 to 10 carbon atoms.

18. The method of claims 1 or 3, wherein the macromonomer is comprised of monomer units selected from the group consisting of methyl, ethyl, propyl and butyl methacrylate; fluorinated alkyl methacrylates, alphamethyl styrene, hydroxyethyl methacrylate, glycidyl methacrylate, methacrylic acid, methacrylonitrile, or combinations thereof.

19. The method of claim 1 or 3, wherein the macromonomer or distribution of macromonomers are the product of a metal chelate chain transfer process.

20. The method of claim 1, wherein the effective amount of macromonomer is in the range of between 0.01% and 80% by weight of the monomers present.

21. The method of claim 20, wherein the effective amount is between 1 and 20% by weight.

* * * * *